Oct. 14, 1930.  J. D. RAYON  1,778,166
INCUBATOR
Filed Aug. 25, 1927  2 Sheets-Sheet 1

Inventor
Joseph D. Rayon
By Mason Fenwick Lawrence
Attorneys

Oct. 14, 1930.  J. D. RAYON  1,778,166
INCUBATOR
Filed Aug. 25, 1927   2 Sheets-Sheet 2
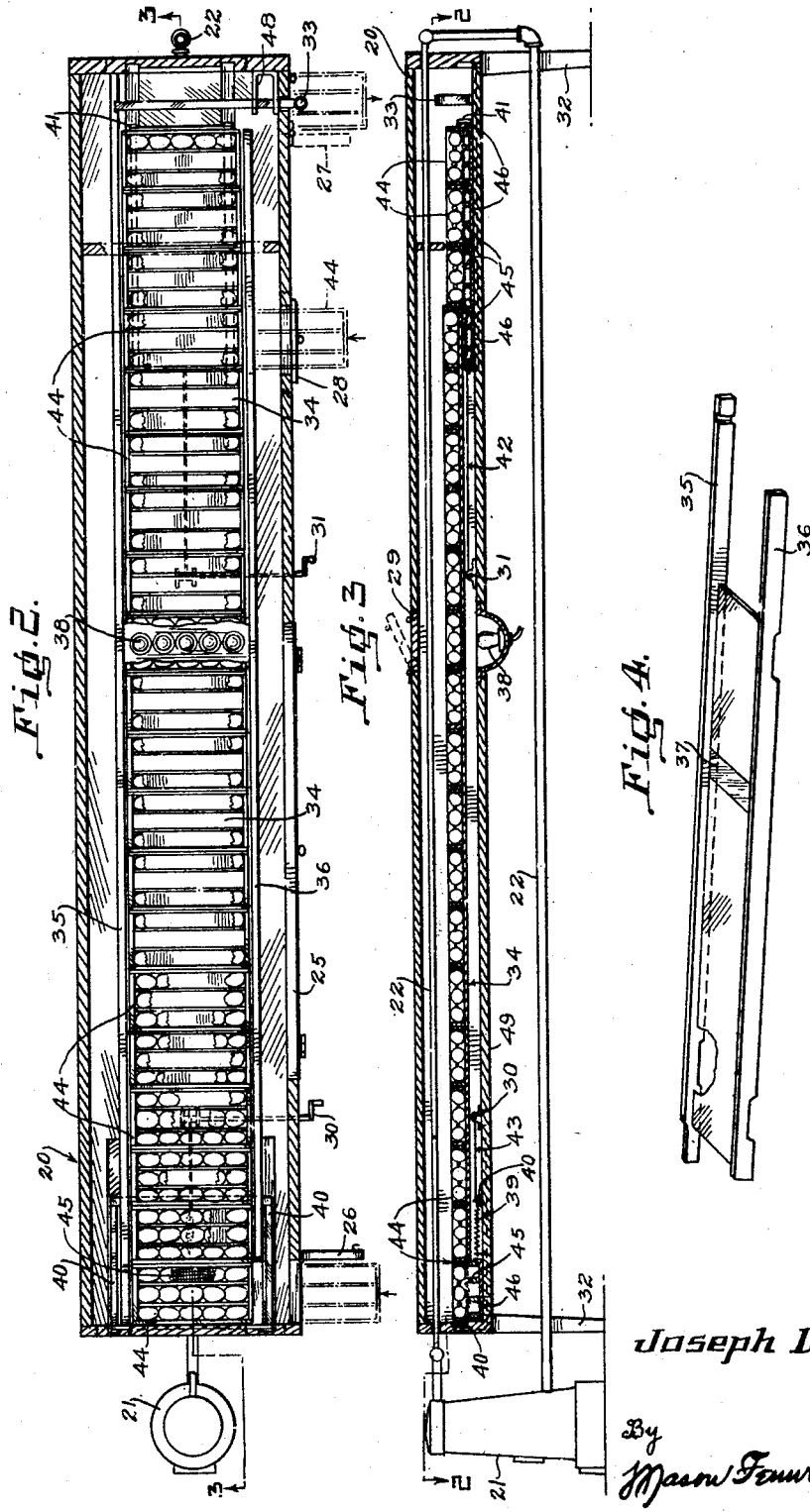
Inventor
Joseph D. Rayon Patented Oct. 14, 1930

1,778,166

UNITED STATES PATENT OFFICE

JOSEPH D. RAYON, OF BEAUMONT, TEXAS

INCUBATOR

Application filed August 25, 1927. Serial No. 215,456.

My invention relates to incubators for hatching the eggs of domestic fowls or other birds. The objects of my invention are: First, to provide an incubator in which the eggs are not touched by human hands in the process of incubation; second, to provide an incubator in which the eggs under incubation may be tested without removing them from the incubator or disturbing them in any way; third, to provide an incubator which automatically transfers the eggs from turner trays to hatching trays; fourth, to provide an incubator which automatically discontinues the turning of the eggs at the proper period of incubation without the necessity of any record on the part of the operator; fifth, to provide an incubator in which a continuous hatch of chicks may be most conveniently obtained; sixth, to save labor in the incubation of eggs; seventh, to provide a novelly constructed and operated incubator of this class.

With these and other objects in view, as will appear hereinafter, my invention consists of certain novel features of construction, combination and arrangement of parts and portions as will be hereinafter described in detail and particularly set forth in the appended claims, reference being had to the accompanying drawings and to characters thereon, which form a part of this application.

The part of my invention comprising the heating, heat controlling, insulating and ventilating systems I do not claim to be new. What I claim to be new are: the egg-testing arrangement in the incubator, the turning device, the automatic device to discontinue the turning of the eggs at the proper period of incubation and to change the eggs from turner trays to hatching trays, the novelly constructed trays.

Figure 2 is a top section plan taken along line 2—2 of Figure 3;

Figure 3 is a vertical section showing the egg trays in place;

Figure 4 is a perspective of the tracks removed from the incubator;

In the drawings similar reference characters will be used to designate corresponding parts thruout the several views.

Figure 1:
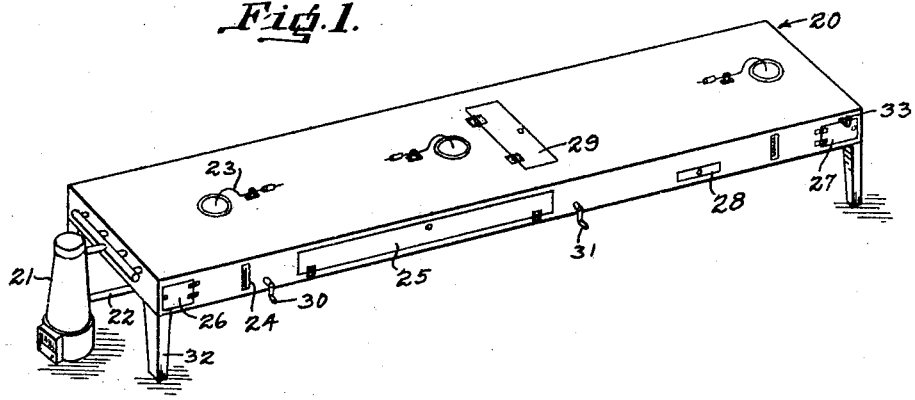
Figure 1 is a perspective of the incubator.
Figure 5:
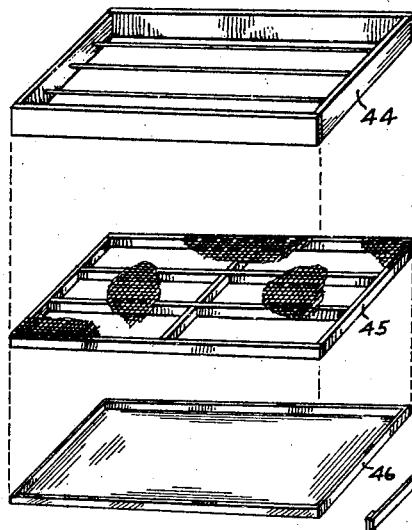
Figure 5 is a perspective of the different sections which go to make up the tray.
Figure 6:
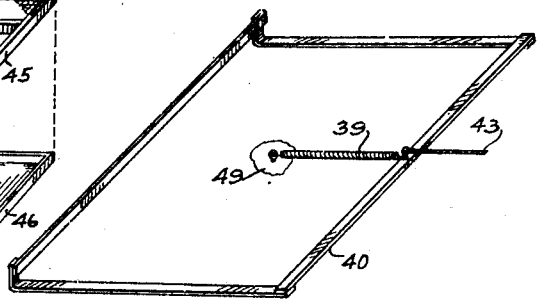
Figure 6 is a perspective of the tray frame.
Figure 7:
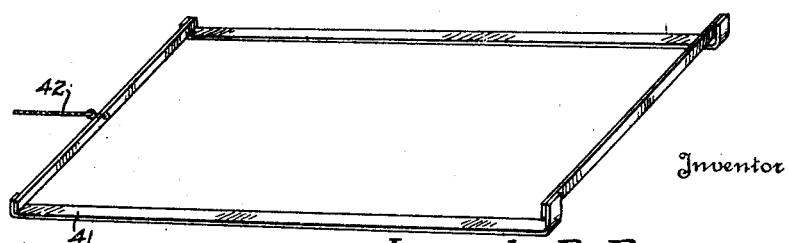
Figure 7 is a perspective of a carrier frame.

My incubator consists of a long rectangular box 20, a hot water heater 21, heat-regulating devices 23. The box 20 is supported by legs 32. The upper portion of the chamber of the box 20 is occupied by hot water pipes 22 leading from the heater 21. These pipes serve to furnish heat to the incubator. The incubator box or case has an inspection door 25. Thermometers 24 indicate the temperature inside the incubator. The box 20 is properly insulated and provided with means to ventilate the same. The portion of the box or case 20 next to the heater will be for convenience in the description of the same, called the rear, the opposite portion, the front. The heater, heat regulators, insulation and ventilation of the incubator being matters well known in the science of incubation will for this reason not be minutely described in this specification.

It is to be understood that other methods of heating my incubator may be used.

My incubator is preferably operated as a continuous hatching machine. A daily supply of eggs is inserted in one end of the incubator and a daily hatch of chicks is extracted from the other end. The daily output of chicks does not take place before the incubator has been supplied daily with eggs for twenty-one days, the period of incubation for hen eggs.

The egg tray, which is an important part of my invention, consists of an open frame 44 and a separate bottom 45. The frame 44 is partitioned into longitudinal sections by means of metal rods secured to said frame. The bottom 45 consists of a frame structure covered with a screen secured to it. The bottom 45 fits into a removable metal pan 46, screen-side up. This metal pan serves to catch egg shells and other fine particles falling thru the screen when chicks are hatching in the tray. The frame 44 is placed upon the bottom 45 and the eggs are placed in rows in the longitudinal sections. The partitions are so distanced as to admit eggs only when they are placed lengthwise in the sections. The tray of eggs is inserted at the rear of the incubator box or case 20 thru the door 26. The tray of eggs is placed opposite the longitudinal track 34, the longitudinal partitions in the frame 44 lying transversely to said track. The track 34 extends nearly the entire length of the incubator chamber. It runs parallel to the incubator floor 49 and above it, leaving an open space between the bottom of the track and the incubator floor. The track is supported and secured to the incubator floor 49 by means of the members 35 and 36 which project above the track 34 and serve as guides for the egg trays. The first tray of eggs placed in the incubator is not disturbed before the next day after it is placed therein. This is the second day of incubation. Now, in order to turn the eggs under incubation the tray frame 44 is pushed upon the track 34 by means of a metal frame 40. From this point on until the eggs cease to turn on the 18th day they are turned through contact with the track 34. Said frame 40 is slidably mounted in grooves in the floor 49 of the incubator. The frame 40 is caused to travel by means of the windlass 30 secured thereto by means of the flexible member 43 and which is manually operated. The frame 40 is so constructed that it forces only the tray frame 44 to move, leaving the tray bottom 45 undisturbed. The top of the tray bottom 45 and the surface of the track 34 are on the same level. So when the tray frame 44 is moved upon the track 34 the eggs within the tray frame are caused to turn or roll. As it is necessary to turn eggs under incubation at least twice a day, morning and evening, the tray frame 44 is caused to travel only half the distance of its width in the morning and the other half distance in the evening. The width of the tray frame 44 is such that when it travels the distance of half its width the eggs are properly turned. The average hen egg measures slightly more than five inches around the center. Therefore, to properly turn it one-half the egg must be rolled sidewise slightly more than two and one-half inches, or slightly more than seven and one-half inches, etc. The frame 40, after having moved the tray frame 44 upon the track 34, is returned to its former position. This is accomplished by reversing the windlass 30, the coil spring 39, having one end secured to the floor of the incubator chamber and the other end to the frame 40, pulls the frame 40 to its original position. Having moved the tray of eggs upon the track 34 and after removing from the incubator the tray bottom used with the said tray of eggs now on the track there is an open space to insert another tray of eggs. The next tray of eggs is inserted after having turned the eggs on the evening of the second day and the same tray bottom that was removed after the first day's operation may be used if desired since the egg tray first inserted is now resting on the track and the tray bottom originally inserted with the first egg tray is no longer in the incubator. On the third day the eggs are turned as described for the second day. By inserting daily a new tray of eggs as described the eggs on the track 34 are caused to travel forward by the force imparted against the tray acted upon by the tray frame 40. By this means it is obvious that all the eggs on the track, as well as those in the newly inserted tray, are moved and properly turned in a mass. On the twelfth day after a tray of eggs is inserted in the incubator the tray reaches a glass section 37 in the track 34. This glass section is in the same plane with the surface of the track 34 so that the trays and eggs may travel freely over it. Beneath this glass section 37 is a battery of powerful electric light bulbs 38. By "turning on" the light the eggs on the glass section are illuminated. Thru the door 29 all the bad eggs may be detected and manually removed from the incubator. When the first tray of eggs inserted in the incubator reaches the end of the track 34, which is after the turning of the eggs on the evening of the seventeenth day of their incubation, the tray frame comes in contact with the metal carrier 41. The carrier 41 is slidably mounted on the floor of the incubator, the side members running in longitudinal grooves in the floor of the incubator. This carrier carries four tray bottoms 45, together with pans 46, in it. These tray bottoms including pans are placed in the carrier thru the door 28. When the tray frame, which comes in contact with the carrier 41, is moved beyond the end of the track 34 it pushes the slidable carrier 41 along with it. As the eggs roll off of the track 34 they roll upon the tray bottom carried by the carrier 41. After the second turning of the eggs on the seventeenth day of incubation, the first tray of eggs which was inserted in the incubator is lying on a tray bottom 45 in carrier 41. Just as the eggs leave the stationary track 34 the eggs cease turning, they simply move on with the tray frame and tray bottom. Thus, the eggs are automatically changed from turner trays to hatching trays. After on the evening of the twenty-first day of incubation the first tray of eggs which was inserted in the incubator will have reached the extreme end of the incubator chamber. The eggs in the tray will be hatched and ready to remove from the incubator on the morning of the twenty-second day. The tray of chicks is removed by means of the manually operated arm 33 which is slidably secured to the incubator case by means of the bearings 48. By the act of pulling the arm outward from the incubator the tray containing the chicks is moved thru the door 27, within reach of the operator. After extracting the tray of chicks the arm 33 is returned to its former position. A space in the carrier 41 will result from the removal of the tray of chicks. By pulling the carrier 41, by means of the manually operated windlass 31, toward the rear of the incubator the space left in the carrier due to the removal of the tray of chicks is taken up and the same amount of space made at the opposite end of the carrier. It is to be understood that the side members of the carrier 41 do not come in contact with the under surfaces of the tray pans contained therein. The trays slide upon the floor of the incubator. The depth of the grooves in which the frame 41 slides permits it to move freely without coming in contact with the bottoms of the trays. After taking up the space left in the carrier after the removal of the tray of chicks another tray bottom 45 positioned in a pan 46 is inserted in the carrier thru the door 28. Thus a tray of chicks is daily removed from the incubator, a tray bottom supplied to the hatching trays, a new tray of eggs inserted in the incubator. If it is desired to discontinue hatching, empty trays are inserted in the incubator. It is to be understood that the incubator may be so designed as to receive any number of trays daily. The partition 47 serves to retain moisture for the eggs in the hatching trays, forming a hatching chamber in the incubator.

It is to be understood that the form of my invention herein shown and described is to be taken as a preferred embodiment of the same, and that various changes in the shape, size and arrangement of parts, may be resorted to, which do not depart from the spirit of my invention or the scope of the sub-joined claims.

Having thus described my invention, what I claim is:

1. An incubator for the hatching of eggs of domestic fowls, or other birds, comprising a case, means for supplying heat to said case, a stationary surface inside said case over which eggs are rolled in the process of turning them, means to illuminate eggs on said surface for the purpose of testing them, means for rolling said eggs over said surface, and for separating the eggs in groups, means for moving egg trays along said surface and from said surface on to bottoms, said bottoms moving along with said frames so as to prevent rotation and thereby forming hatching trays instead of turner trays.

2. An incubator for the hatching of eggs of domestic fowls, or other birds, comprising a case, means for supplying heat to said case, a door in said case through which to insert eggs in egg trays, and a screened frame positioned screen side up in a metal pan with the egg trays proper superimposed upon the screen frame and constructed to expose the bottom of the eggs in contact with the screen side of the screened frame, a frame attached to a windlass for pushing the said egg trays forward from the screened frame to a stationary track, spring means for returning the said frame to its initial position, means intermediate the ends of said case for testing the said eggs, a door in the said case for the purpose of removing unfertile eggs, a door for inserting tray bottoms at a point adjacent the end of the track, a second frame for moving with said tray bottoms and said egg trays, said frame propelled by the foremost egg tray, a windlass for returning the frame to its initial position upon the foremost egg tray and tray bottom being removed from the incubator, and means comprising an arm for removing said foremost egg tray and tray bottom from the incubator.

3. In an incubator, a track, a plurality of egg trays constructed to expose the bottom of the eggs, whereby the eggs will engage the track, means for advancing the trays over the track whereby the eggs will be advanced and rotated and means adapted to be interposed between the egg trays and the bottom of the incubator to advance with the trays, whereby the eggs can be advanced without rotation.

4. In an incubator, a track, a plurality of egg trays constructed to expose the bottom of the eggs, whereby the eggs will engage the track, tray advancing means adapted to contact with and advance one tray and by contact of said tray to advance the other contacting trays, and means adapted to be interposed at a predetermined point between the eggs and the bottom of the incubator to advance with the trays, whereby the eggs can be advanced without rotation.

5. In an incubator, a track, a plurality of egg trays constructed to expose the bottom of the eggs, whereby the eggs will engage the track, tray advancing means adapted to contact with and advance one tray and by contact of said tray to advance the other contacting trays, means adapted to be interposed at a predetermined point between the egg trays and the bottom of the incubator to advance with the trays, whereby the eggs can be advanced without rotation, and means for removing said egg trays and interposed means from the incubator after hatching.

6. In an incubator, a track, a plurality of egg trays constructed to expose the bottom of the eggs whereby the eggs will engage the track, a reciprocating tray advancing means whereby the eggs will be advanced and rotated, means adapted to be interposed between the egg trays and bottom of the incubator to advance with the trays, means for advancing said interposed means with the advancement of said egg trays and means for removing said egg trays and interposed means from the incubator after hatching.

7. In an incubator, a track, a plurality of egg trays constructed to expose the bottom of the eggs, whereby the eggs will engage the track, a tray advancing means whereby the eggs will be advanced and rotated, a plurality of tray bottoms to be interposed between the egg trays and the bottom of the incubator, means propelled by the foremost egg tray for advancing the plurality of tray bottoms.

8. In an incubator, a track, a plurality of egg trays constructed to expose the bottom of the eggs, whereby the eggs will engage the track, a tray advancing means whereby the eggs will be advanced and rotated, a plurality of tray bottoms to be interposed between the egg trays and the bottom of the incubator, means propelled by the foremost egg tray for advancing the plurality of tray bottoms, and means for returning the means used for advancing the tray bottom to its initial position upon the removal of the foremost tray bottom and egg tray from the incubator, after hatching.

9. In an incubator, a track, a plurality of egg trays constructed to expose the bottom of the eggs, whereby the eggs will engage the track, a tray advancing means whereby the eggs will be advanced and rotated, a plurality of tray bottoms to be interposed between the egg trays and the bottom of the incubator, means propelled by the foremost egg tray for advancing the plurality of tray bottoms, and means for returning the means used for advancing the tray bottom to its initial position and means for removing said tray bottoms and egg trays from the incubator after hatching.

In testimony whereof I affix my signature.

JOSEPH D. RAYON.